Patented July 1, 1930

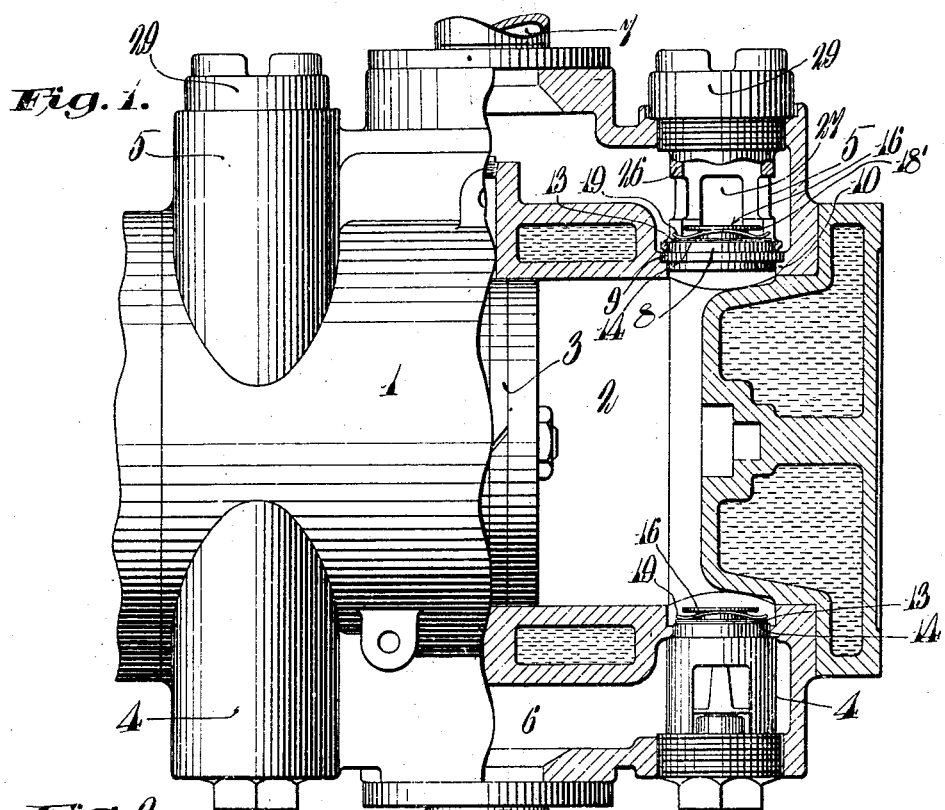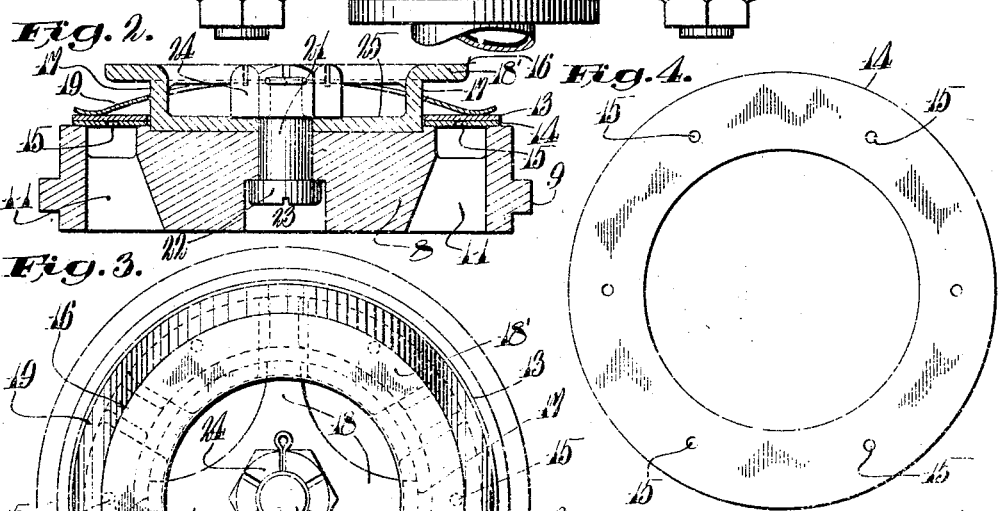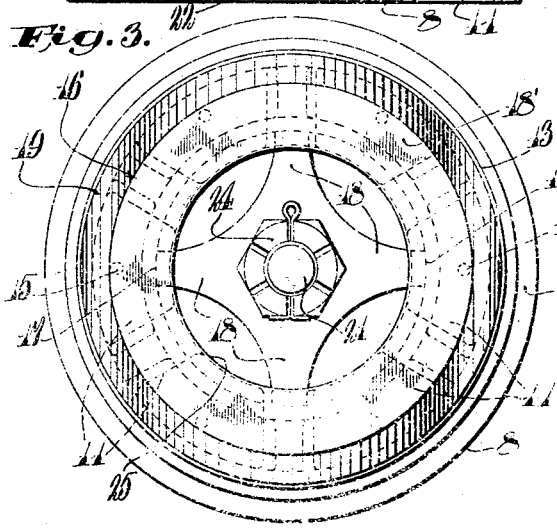

1,768,844

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE

Application filed April 10, 1922. Serial No. 551,327.

My invention relates to valves.

It has for its object to provide an improved valve and one particularly adapted to use with high pressure. A further object of my invention is to provide a valve adapted to reduce to a minimum the necessary clearance space within a compressor cylinder. A more specific object of my invention is to provide a valve of the plate type which is especially adapted to use in place of poppet valves in high speed compressors and a valve of such character that it may be manufactured more cheaply than poppet valves and will provide a more silent operation than poppet valves. These and other objects of my invention will hereinafter more fully appear.

In the accompanying drawings I have shown for purposes of illustration one form which my invention may assume in practice.

In these drawings,—

Fig. 1 is a side elevation of the compressor cylinder partially in section equipped with my improved valve mechanism.

Fig. 2 is a detail sectional view of a discharge valve mechanism.

Fig. 3 is a plan view of the valve mechanism.

Fig. 4 is a plan view of one of the valve elements.

In the illustrative construction I have shown a compressor cylinder 1 having a bore 2 in which a piston 3 is reciprocable. The cylinder 1 is provided with inlet valve mechanism 4 and discharge valve mechanism 5 of the general construction described and claimed in my co-pending application, Ser. No. 142,706, filed Jan. 16, 1917, these valves controlling the communication between the interior of the cylinder and the intake 6 and discharge pipe 7 respectively. In describing my improvement, I shall refer to a discharge valve only, it being understood that the inlet valve is of substantially identical construction. As illustrated in Fig. 2, it will be noted that I have provided a valve seat 8 having an annular flange 9 formed thereon between the upper and lower surfaces thereof and adapted to rest on a corresponding flanged portion 10 formed in the cylinder member. In this member 8 one or more ports 11 preferably arcuate in shape are provided and over these ports is disposed an annular valve mechanism comprising a pair of annular members 13 and 14 composed of quite thin resilient sheet material. The inner and outer peripheries of the member 14 rest on the member 8. The member 14 is traversed by a series of small holes 15 whose function in connection with the members 13 and 14 will be hereafter more fully described. Disposed over the valve members 13 and 14 and suitably clamped to the member 8 is a guard 16 having annularly disposed guiding portions 17 herein shown to be formed on radially extending wings 18 adapted to engage the inner peripheries of the valve members 13 and 14 and guide the latter as they are lifted by the action of the pressure fluid passing through the ports 11. The guard member 16 is likewise provided at its upper end with a laterally extending preferably annular flange 18' adapted to engage with a transversely flexed annular valve spring 19 preferably formed of thin resilient sheet metal and preferably having slightly upturned ends to reduce wear, the ends being herein shown as contacting with the valve member 13 at diametrically opposite loci while the central portions of the valve spring contact with the rim 18', but it will be obvious that if desired, the reverse arrangement could be employed by the provision of a slightly wider rim 18'. The member 16 is rigidly clamped to the member 8 by means of a bolt 21 having its head 22 seated in a recess 23 in the lower surface of the member 8 as indicated, while the cooperating nut 24 is disposed within a depressed central portion 25 of the member 16. For the purpose of maintaining the valve seat member 8 in operative position in the cylinder a cage-like member 26 of generally cylindrical outline but cut-away as indicated at 27 is threaded into the cylinder casing and engages at its lower end the flange 9 to clamp the member 8 rigidly upon the surface 10. A suitable closure member 29 is secured upon the outside of the upper threaded end of the member 26.

From the foregoing description the mode of operation of this device will be readily apparent. It will be understood that in ordinary sheet metal, there are certain surface irregularities and that accordingly two pieces of sheet metal laid one upon the top of the other will not normally contact uniformly over their entire areas, but will have certain interstices between them so that there is not a uniform complete surface contact. It is of this fact that I take advantage in my improved valve mechanism. It will be understood that the valve member 14 by reason of the pressure of the spring and the further pressure of the air within the discharge line will be forced into a tight engagement with its seat upon the member 8 and so that an adequate seal will be provided. It will be observed that by reason of the pressure of the spring and compressor discharge pressure upon the member 13, it will be forced into sufficiently close contact with the member 14 to seal off the openings 15 through the latter. When, however, the valve has been opened, it will be noted that there will be a certain tendency for a loosening of the plates from each other since the air will be able to obtain access to the spaces between the plates, and since there will not be a positive abutment against which the lower plate rests to enable the two plates to be pressed forcibly into engagement with each other. As a result the two plates 13 and 14 when the latter again strikes the seat will not strike with the shock that would occur were their material concentrated in a single mass, but by reason of the small inequalities in their surfaces, there will be a combined cushioning and spring action which will decidedly reduce the violence of the impact of the valve upon its seat. The squeezing out of the air from the above mentioned spaces will also cushion the action. It will therefore be clear that my improved valve mechanism will be silent in operation, not liable to breakage due to sharp shocks and yet provide a wholly tight seal when closed.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A valve mechanism comprising in combination, a ported seat, a guard, valve means cooperating with said seat comprising a plurality of superimposed thin annular members having their adjacent surfaces normally in contact, and a flexible annular bowed spring engaging said guard and one of said members, said spring engaging said latter member at diametrically opposite loci.

2. A valve mechanism comprising in combination, an annularly ported seat member, an annular guard superimposed thereover in spaced relation thereto, a plurality of metallic annuli of substantially identical form superimposed upon said seat and controlling the ports therein, a transversely flexed annular spring engaging said guard and one of said annuli, said spring engaging the latter at diametrically opposite loci, and an opening formed in one of said annuli for effecting an air cushion between said annuli during seating movement thereof.

3. A valve mechanism comprising in combination, a ported seat, a guard parallel thereto, valve means cooperating with said seat comprising a plurality of annular flexible valve members, a transversely flexed annular spring engaging said guard and one of said valve members at the outer edge of the latter, and means permitting a fluid cushion between said valve members during seating movement thereof comprising a plurality of apertures formed centrally between the inner and outer edges of one of said members.

4. A valve mechanism comprising in combination, a ported seat, a guard parallel thereto, valve means cooperating with said seat comprising a plurality of annular flexible valve members, a transversely flexed annular spring engaging said guard and one of said valve members, said spring engaging the latter at the outer edge thereof at a plurality of spaced loci, and means permitting a fluid cushion between said valve members during seating movement thereof comprising a plurality of apertures formed centrally between the inner and outer edges of one of said members.

5. A valve mechanism comprising in combination, a ported seat, a guard parallel thereto, valve means cooperating with said seat and comprising a plurality of superimposed annular flexible valve members, a transversely flexed annular spring engaging said guard and one of said valve members, said spring engaging the latter at the outer edge thereof, and means permitting a fluid cushion between said valve members during seating movement thereof including a plurality of apertures in the bottom valve member.

6. A valve mechanism comprising in combination, a ported seat, a guard parallel thereto, valve means cooperating with said seat comprising a plurality of superimposed flexible valve members, a spring engaging said guard and the uppermost of said valve members, said spring engaging the latter member at the outside edge thereof, and means permitting a fluid cushion between said valve members during seating movement thereof comprising a plurality of spaced restricted apertures formed centrally between the inner and outer edges of the lowermost valve member.

7. A valve mechanism comprising a ported seat, a guard, a series of members disposed between said guard and seat, a plurality of which are substantially identical, said series of members providing valve seating means and valve means and said substantially identical members having surfaces contacting over substantially their entire areas when said valve means is seated, said valve seating means being transversely bowed and having extremities engaging said valve means only at diametrically opposite loci.

8. A valve mechanism comprising, in combination, a ported seat, a guard, valve means cooperating with said seat comprising a plurality of superimposed thin annular flexible valve plates having their adjacent surfaces normally in contact, and a transversely flexed annular spring engaging said guard and one of said plates, said spring engaging the latter at diametrically opposite loci whereby certain portions of said valve plates have greater relative movement than other portions thereof during lifting movement of said valve plates.

9. A valve mechanism comprising, in combination, a ported seat, a guard, valve means cooperating with said seat comprising a pair of superimposed valve members of thin relatively elastic material having their adjacent surfaces normally in contact, and a transversely flexed annular spring engaging said guard and one of said members, said spring engaging said latter member at diametrically opposite loci, that one of said members which engages said seat being perforated and the other being imperforate thereby permitting an air cushion therebetween during seating movement thereof.

10. A valve mechanism comprising, in combination, an annularly ported seat, an annular guard superimposed thereon in spaced relation thereto, valve means cooperating with said seat comprising a plurality of superimposed thin annular valve plates having their adjacent surfaces normally in contact, one of said plates being perforated and another being imperforate, said plates being disposed between said guard and said seat with the perforated plate toward the seat, and a transversely flexed annular spring engaging said guard and one of said valve plates, said spring engaging said latter plate at diametrically opposite loci.

In testimony whereof I affix my signature.

FRED D. HOLDSWORTH.